Aug. 11, 1953 — H. H. GATES — 2,648,135
FACE RUN-OUT GAUGE
Filed Nov. 2, 1949 — 2 Sheets-Sheet 1

Inventor
Hesslar H. Gates

Aug. 11, 1953     H. H. GATES     2,648,135
FACE RUN-OUT GAUGE
Filed Nov. 2, 1949                                     2 Sheets-Sheet 2
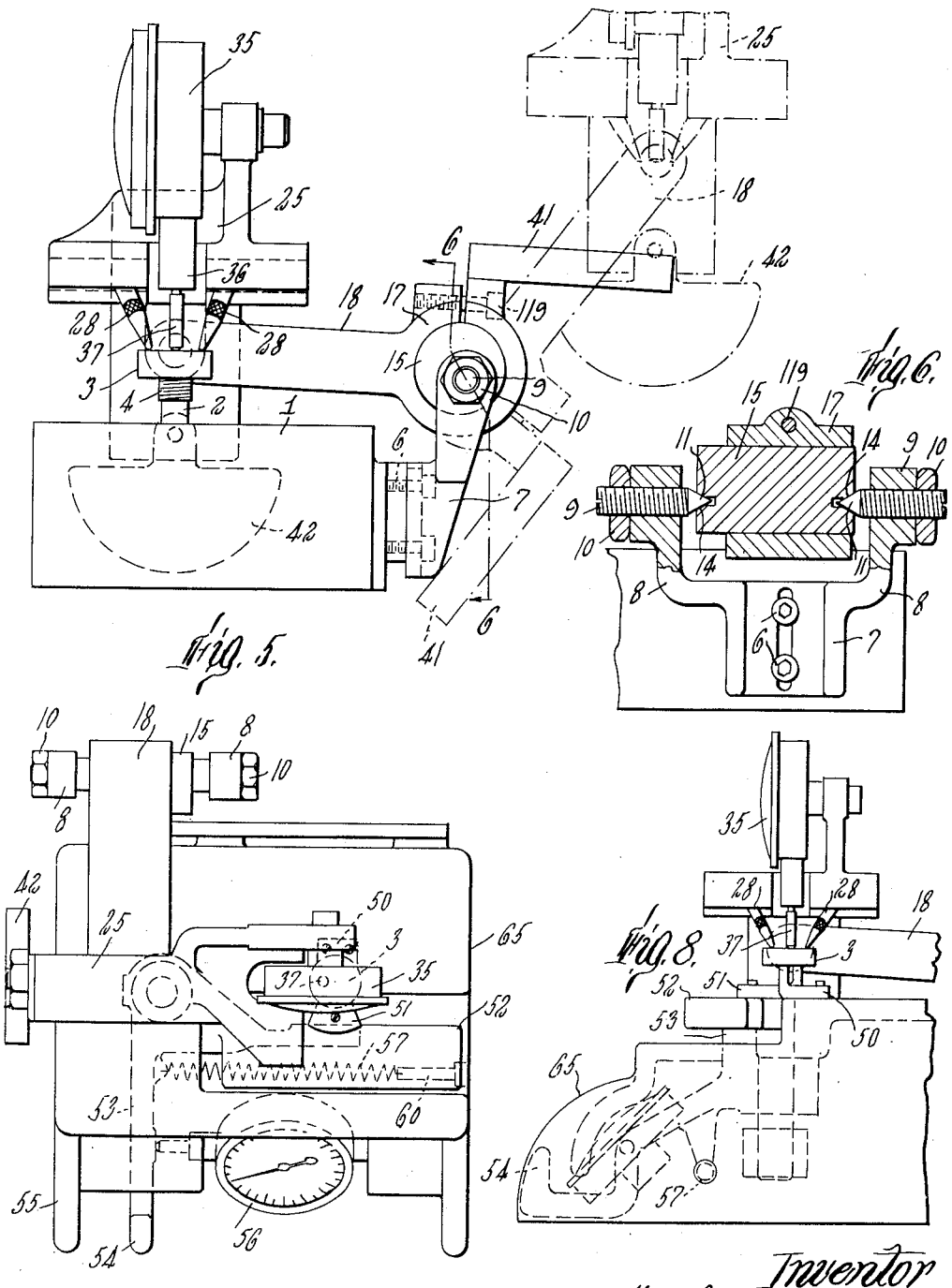
Inventor
Hesslar H. Gates
by
Wright Brown Quimby Moss
Attys.

Patented Aug. 11, 1953

2,648,135

UNITED STATES PATENT OFFICE 2,648,135

FACE RUN-OUT GAUGE

Hesslar H. Gates, Charlestown, N. H., assignor to Bryant Chucking Grinder Company, Springfield, Vt., a corporation of Vermont Application November 2, 1949, Serial No. 125,103

5 Claims. (Cl. 33—174)

This invention relates to gages for testing the accuracy of a surface of an internal or externally threaded or plane diameter work piece with relation to the axis of the diameter, and it has for an object to provide such a gage wherein the alinement of the gaging elements is determined by the surface to be gaged.

A further object is to provide such a gage wherein axial motion of the work piece during the gaging operation has no effect on the indicator reading and without requiring the use of any external parallel motion.

Further objects and advantages will appear from a description of certain embodiments of the invention shown in the accompanying drawings in which Figure 1 is a top plan view of a gage for testing internally threaded work and embodying the invention.

Figure 5 is a side elevation of the gage shown in Figures 1 to 3, inclusive.

Figure 6 is a detail sectional view on line 6—6 of Figure 5.

Figures 7 and 8 are top plan and side elevational views, respectively, showing a modified gage construction.

Figure 1:
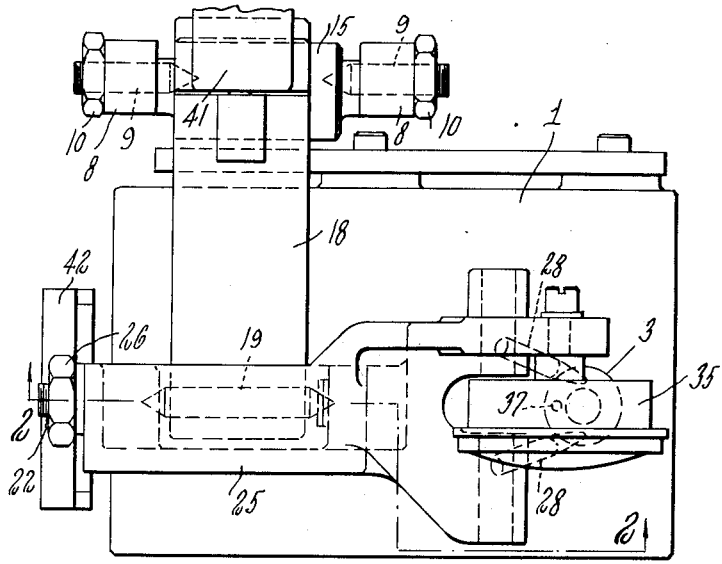
Figure 3:
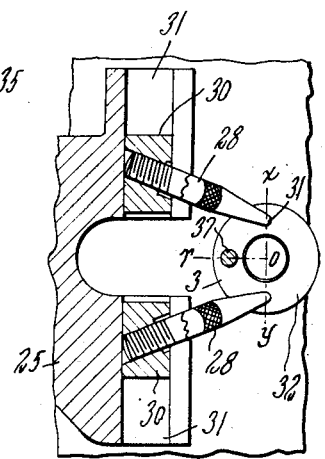
Figure 3 is a detail sectional view on line 3—3 of Figure 2.
Figure 2:
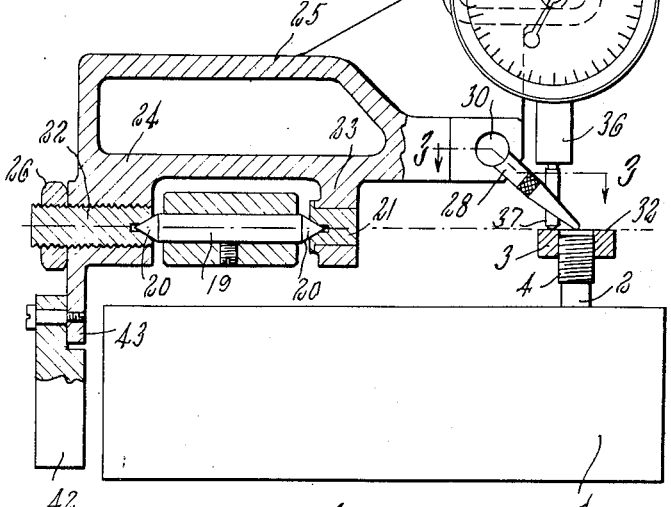
Figure 2 is a vertical sectional view on line 2—2 of Figure 1.

Referring first to Figures 1 to 3, 5 and 6, the gage comprises a support 1 having means such as a post 2 extending upwardly therefrom for supporting a work piece to be gaged at 3. As shown this support 2 is threaded at 4 for engagement with internal threads on the work piece in such a manner that the work piece may be rotated during the gaging action. Where threaded engagement exists between the post and the work piece it will be noted that rotation of the work piece will be accomplished by axial motion of the work with respect to the support 1, but as will later more fully appear, this gage is also usable where the work-supporting post is unthreaded and supports internal work for rotation unaccompanied by any axial motion thereof, or as will later appear, it is applicable to a work piece having an external plane or threaded shank portion about the axis of which it may be turned.

The rear face of the support 1 has attached thereto, as by screws 6, a bracket 7 which has a pair of spaced oppositely disposed bearing portions 8 (see Fig. 6) which support cone centers 9 shown as threaded therethrough and provided with lock nuts 10 by which they may be secured in adjusted positions. The inner cone ends 11 of the centers 9 engage in mating bearing openings 14 in a cylindrical block 15, this block being journaled on the centers 9 eccentric to its axis. The block 15 is held in adjusted angular position within a cylindrical split bearing 17 at one end of an arm 18. When the block 15 is adjusted to the desired angular position, it may be clamped in such position by the clamp screw 119 which closes the split portions of the cylindrical bearing 17 against the block 15. The forward end of the arm 18 carries a bearing pin 19 having conical ends 20 which find bearing in a fixed bearing plug 21 at one end and in a threaded bearing plug 22 at the other end. These plugs are seated in side wall portions 23 and 24 of a second arm 25 which extend at right angles to the arm 18. The bearing screw 22 may be adjusted to take up wear in the pivotal mounting of the arm 25 and may be fixed in adjusted position as by a lock nut 26.

The arm 25 extends over the support 1 in normal position of the parts and at its forward end it carries a pair of relatively fixed work-engaging anvils 28. As shown best in Figure 3, these anvils may be threaded into blocks 30 seated in ways 31 and they extend in inclined relation to each other such that their ends 29 may engage on the top face 32 of the work piece 3 substantially diametrically opposite to each other with relation to the axis of the post 2 on which the work piece is rotatably carried.

The angular adjustment of the cylindrical block 15 provides for shifting the engagement of the relatively fixed anvils on the work piece to such positions that they engage the work piece face 32 substantially equidistant from the axis of rotation of the work piece and at substantially diametrically spaced points, a free pivotal mounting of the arm 25 permitting the fixed anvils to engage the work piece to determine the angular position of this arm 25. The arm 25 also carries a dial indicator 35 provided with a stem 36 which carries a relatively movable anvil 37. This anvil 37 as shown is arranged to engage the face 32 of the work piece substantially equidistant from the engagements of the relatively fixed anvils 28 thereon and substantially in a radius $r$ from the axis of the work piece $o$, angularly spaced substantially 90° from the diameter $x$–$y$ where the fixed anvils engage the work face. While the relative positions of engagement between the fixed and movable anvils on the work face may be varied, it is important that the axes of the pivot pin 19 and of the rotation of the work piece be substantially perpendicular to each other, and that the axis of the pin 19 intersects a straight line joining the fixed anvil points 29. Under such conditions the axis of the pin 19 will lie in a plane determined by the points 29 and the point of engagement on the work face of the movable anvil 37 when there is no runout, and this plane will rock about the line joining the fixed anvil points 29 away from the axis of the pin 19 and cause corresponding motion of the indicator pointer as the work is turned about its axis if runout of the work face be present. By rotation of the work piece when the anvils are thus in engagement with the face 32, any inaccuracy in this face with respect to the perpendicular to the work axis will result in changes in position of the movable anvil which will be reflected in movements of the pointer 40 of the dial indicator.

In order that the anvils may bear against the work face with the desired amount of pressure, means may be provided for more or less counterbalancing the weight of the arms 18 and 25 and the parts carried thereby. For example, the counteweight 41 may be carried by the split clamp ring 17 and is positioned on the opposite side of the axis of rotation of the arm 18 about the centers 9 from the anvils and the indicator. The arm 25 also may be provided with a counterweight 42 (see Figures 1, 2 and 5) which is supported from a flange 43 depending from the arm 25 and on the other side of the axis of rotation of the arm 25 from the parts carried by the arm 25, thus to tend to hold the movable anvil 37 in an upright position.

It will thus be seen that the dial indicator is responsive to relative motion between the relatively movable and the stationary anvils all of which engage the face of the work to be gaged. Thus this response of the indicator is independent of axial motions of the work piece while it is being turned about its axis so that even though the work piece is threaded and must therefore move longitudinally of its axis while being rotated, the action of the indicator is not affected thereby.

Figure 4:
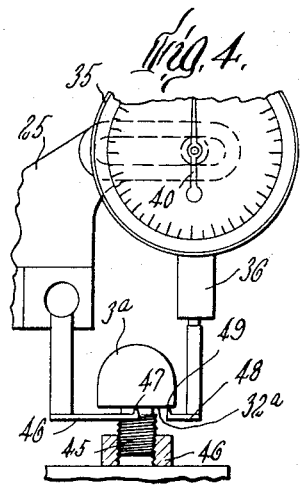
Figure 4 is a view similar to a portion of Figure 2, but showing a gage for testing externally threaded work and arranged to gage an under face of the work.

By suitable choice of the counterbalance weights the amount of pressure of the anvils upon the work piece face may be adjusted as desired. For example, as shown in Figure 4, the counterbalance 41 may be made to overbalance the weight of the parts tending to press the gaging elements downwardly, so that they may be brought upwardly against the under face 32a of the work piece 3a. This work piece is shown as provided with an externally threaded shank portion 45 which engages in an internally threaded supporting element 46. It will thus be seen that the mechanism can be made to operate upon work pieces having internal or external threads or cylindrical openings or shanks determining the axis of rotation, and that the face to be gaged may be either an upper or under face depending upon the size of the counterweight used and the dispositions of the anvils. For example, as shown in Figure 4, the relatively fixed anvils 46 have upwardly turned extremities 47 which engage the face 32a substantially diametrically and on opposite sides of the threaded shank 45, while the movable anvil 48 has an up-turned extremity 49 which engages the same face on a radius substantially perpendicular to the diameter at which the relatively fixed anvil portions 47 engage this face.

Here, again, any vertical motion of the work piece which may take place during its rotation, as by its threaded mounting, is ineffective on the response of the dial indicator 35.

In place of employing this gage as a separate mechanism, it may be incorporated in an external or internal thread or cylindrical gage. For example, as shown in Figure 7, it is only necessary that the work piece be supported by the diameter-indicating means, such, for example, as the relatively fixed anvil 50 and the relatively movable anvil 51, the latter being carried by a pivoted arm 52, permitting the spacing of these elements to be responsive to the work size. For example, these anvils may have points which engage within the threads of an internally threaded work piece. The arm 52 may have an extension 53 terminating in a finger portion 54 which may be pressed toward a fixed finger portion 55 in order to open the gage so as to permit the insertion or removal of the work piece. A size indicating dial indicator 56 may engage with one of the finger portions 54, thus to show the extent of opening of the size anvils when a work piece is supported thereon and a spring 57 reacting between the movable element 53 and a fixed portion 60 of the gage frame will act to press the anvils against the work piece with the desired pressure for the size gaging action and to hold the work piece with capability of being rotated about its axis for the gaging action of face run-out gaging elements 28 and 37. These run-out gage elements 28 and 37 may be supported by the arms 25 and 18 which are mounted on the gage base 65 in the same manner as previously described with reference to the support 1.

From the foregoing description of certain embodiments of this invention it will be evident to those skilled in the art that various changes and modifications may be made without departing from its spirit or scope.

I claim:

1. A gage of the class described comprising a support having means for supporting a work piece for rotation about an axis, a member carried by said support for motion generally lengthwise of said axis and having a pair of spaced elements engageable at their ends with an end face of a work piece so supported, said member being rockably mounted on an axis substantially intersecting a line joining said ends to permit said ends to automatically adjust to such engagement regardless of the angular relation of said end face to said axis, and an indicator carried by said member and having a stem positioned for engagement on said end face spaced at one side of a line connecting said element ends.

2. A gage of the class described, comprising means for holding a work piece to be gaged for turning about an axis, means for engaging an end face of said work piece transverse to said axis at a pair of spaced positions, said engaging means being mounted for rocking motion about an axis substantially intersecting a straight line connecting said positions, a movable gaging anvil engageable with said face at one side of said line and mounted for motion in the direction of said first mentioned axis relative to said engaging means, and means for indicating variations in the position of said gaging anvil with respect to said line as said work piece is being rotated about said first mentioned axis.

3. A gage of the class described, comprising means for holding a work piece to be gaged for turning about an axis, means for engaging a face of said work piece at a pair of positions substantially diametrically opposed across said axis, a movable gaging anvil engageable with said face at one side of a straight line connecting said positions and substantially equidistant from said positions, means for indicating variations in the position of said movable anvil as said work piece is being rotated about said axis, a pair of arms arranged perpendicular to each other, means pivotally mounting one of said arms on the other of said arms, means pivotally supporting the other of said arms on an axis parallel to the axis of said pivotal mounting of said one arm, said one arm carrying said face-engaging means, said gaging anvil and said indicating means, and a counterweight carried by said one arm tending to hold said movable anvil vertically in all angular positions of the other of said arms.

4. A gage of the class described, comprising a support, a cylindrical member pivoted eccentrically to said support, an arm having a portion for clamping engagement with said member and relative to which said member is angularly adjustable about its axis, a second arm freely pivoted to said first-mentioned arm parallel to the pivotal axis of said member, means carried by said support for carrying a work piece to be gaged rotatable about an axis perpendicular to said pivotal axes, a pair of relatively fixed anvils carried by said second arm for engagement with a face of said work piece at spaced points, a line connecting said points intersecting the axis of the pivotal connection of said second arm to said first mentioned arm, a movable anvil movably carried by said second arm for engagement with said work piece face on a radius from said work piece axis substantially perpendicular to said line between said points, and an indicator carried by said second arm and responsive to the position of said movable anvil.

5. A gage of the class described, comprising a support, a cylindrical member pivoted eccentrically to said support, an arm having a portion for clamping engagement with said member and relative to which said member is angularly adjustable about its axis, a second arm freely pivoted to said first-mentioned arm parallel to the pivotal axis of said member, means carried by said support for carrying a work piece to be gaged rotatable about a substantially vertical axis, a pair of relatively fixed anvils carried by said second arm for engagement with a face of said work piece at points disposed substantially diametrical to said work piece axis, a movable anvil movably carried by said second arm for engagement with said work piece face on a radius from said work piece axis substantially perpendicular to a straight line between said points, an indicator carried by said second arm and responsive to the position of said movable anvil, and means for counterweighting said arms to determine the pressure exerted on said work face by said anvils.

HESSLAR H. GATES.

References Cited in the file of this patent

UNITED STATES PATENTS

| Number | Name | Date |
|---|---|---|
| 2,224,728 | Gulliksen | Dec. 10, 1940 |
| 2,233,626 | McClure | Mar. 4, 1941 |
| 2,309,891 | Fisk | Feb. 2, 1943 |
| 2,331,987 | Leatherman | Oct. 19, 1943 |
| 2,427,152 | Moore | Sept. 9, 1947 |